(12) United States Patent
Ageheim et al.

(10) Patent No.: US 6,986,622 B2
(45) Date of Patent: Jan. 17, 2006

(54) CONTAINMENT SYSTEM

(75) Inventors: Jan Ageheim, Ipswich (GB); Glyn A. V. Owens, Ipswich (GB); Wayne Clifton Augustus Wright, Maidstone (GB)

(73) Assignee: Petro Technik Limited (GB)

( * ) Notice: Subject to any disclaimer, the term of this patent is extended or adjusted under 35 U.S.C. 154(b) by 12 days.

(21) Appl. No.: 10/221,232

(22) PCT Filed: Mar. 8, 2001

(86) PCT No.: PCT/GB01/00995

§ 371 (c)(1),
(2), (4) Date: Dec. 17, 2002

(87) PCT Pub. No.: WO01/66993

PCT Pub. Date: Sep. 13, 2001

(65) Prior Publication Data

US 2003/0178094 A1 Sep. 25, 2003

(30) Foreign Application Priority Data

Mar. 8, 2000 (GB) .............................................. 0005508
Apr. 19, 2000 (GB) .............................................. 0009553

(51) Int. Cl.
*B65G 5/00* (2006.01)
*F17D 1/08* (2006.01)

(52) U.S. Cl. ........................ 405/52; 405/51; 137/236.1; 137/363

(58) Field of Classification Search .............. 137/236.1, 137/234.6, 363, 364; 138/111–114, 118.1; 141/44, 45, 59; 405/36, 51–54
See application file for complete search history.

(56) References Cited

U.S. PATENT DOCUMENTS

| 4,653,541 | A | * | 3/1987 | Oehlschlaeger et al. | ..... 138/104 |
| 5,135,324 | A | | 8/1992 | Bravo | .......................... 405/52 |
| 5,372,454 | A | * | 12/1994 | Lawrence | ..................... 405/53 |
| 5,535,793 | A | * | 7/1996 | Tantre | ......................... 141/337 |
| 5,586,586 | A | * | 12/1996 | Fiech | ............................ 141/98 |
| 5,590,981 | A | * | 1/1997 | Osborne | .................. 405/154.1 |
| 5,819,975 | A | * | 10/1998 | Pendleton et al. | .......... 220/484 |
| 5,988,944 | A | * | 11/1999 | Youngs | ........................ 405/52 |

FOREIGN PATENT DOCUMENTS

| EP | 0385860 | 2/1990 |
| EP | 0931761 | 7/1999 |
| WO | WO 9925644 A1 * | 5/1999 |

OTHER PUBLICATIONS

International Search Report—PCT/GB01/00995.

* cited by examiner

*Primary Examiner*—Thomas B. Will
*Assistant Examiner*—Tara L. Mayo
(74) *Attorney, Agent, or Firm*—Galgano & Burke, LLP

(57) ABSTRACT

A pipework containment system comprising:
(i) an outer containment pipe extending between a chamber and a sump;
(ii) a fluid-tight seal between the outer containment pipe and the chamber;
(iii) a fluid-tight seal between the outer containment pipe and the sump;
(iv) a plurality of flexible supply pipes extending between said chamber and said sump;
characterized in that the plurality of supply pipes are contained within one and the same outer containment pipe, the arrangement of supply pipes within the outer pipe and the flexibility of the supply pipes being such that each individual supply pipe may be withdrawn from the system and/or replaced after construction of the pipework containment system is complete.

18 Claims, 5 Drawing Sheets

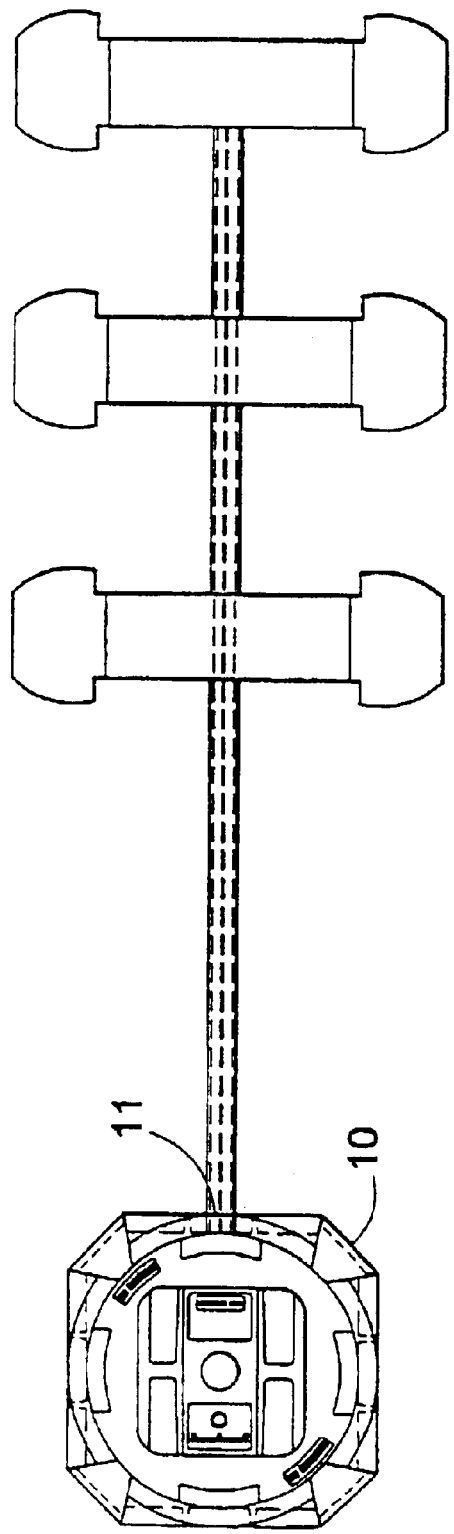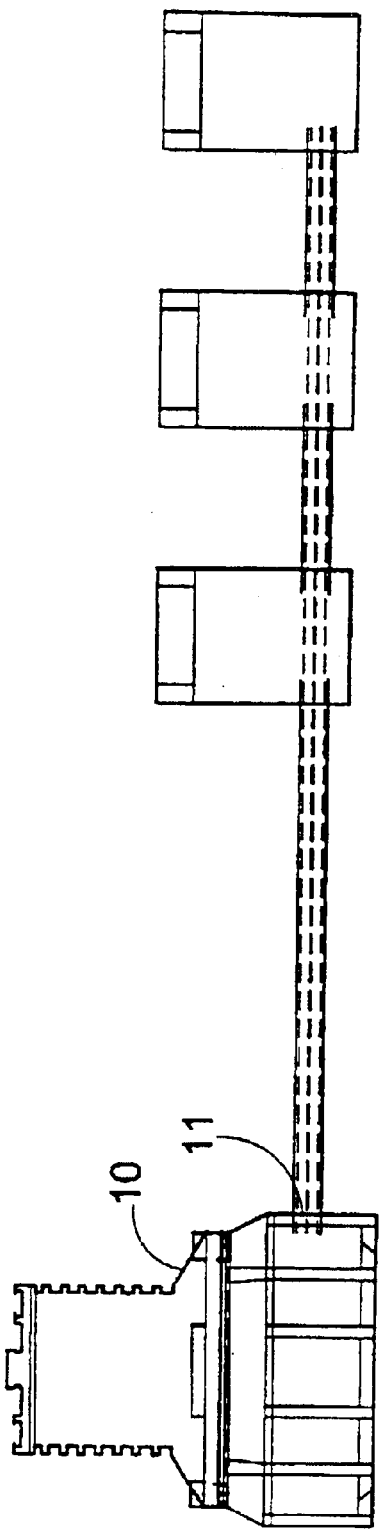

Electrofusion fitting example

Compression fittings example, under pump solution showing tee off to adjacent sump

CONTAINMENT SYSTEM

FIELD OF THE INVENTION

The present invention relates to improved containment systems for pipelines. It is particularly applicable, but in no way limited, to containment systems for use at petrol station installations.

BACKGROUND TO THE INVENTION

Oil companies have been under considerable pressure to ensure that environmental concerns are given priority in the planning and installation of petrol station infrastructures. This has not been without significant on-cost. One important advancement has been the use of pipeline systems constructed from plastics materials which have enabled the oil companies to install cost-effective environmentally acceptable alternatives to steel pipework systems which tend to corrode over time.

However, over recent years there have been major developments in fuel technology which have culminated in commercially available alternative fuels containing additives which have replaced lead-based antiknock compounds. Research continues to center on reducing sulphur content and hazardous emissions from fuel. In order to eliminate lead and sulphur from fuels, exotic additives and octane enhancers such as MTBE (methyl tertiary butyl ether) have been developed which are based on complex organic or heavy metal organic additives.

The presence of these additives in fuel can give rise to major environmental issues. Some such issues are described in an article entitled "MBTE—How should Europe Respond", in Petroleum Review February 2000 pages 37–38. The entire text of this article is incorporated herein by reference by way of background information. The authors conclude that lead and some other metals are the most effective octane enhancers. However, lead is in the final stages of being phased out because of environmental and health issues, and the most readily available alternative, MMT (methylcyclopentadienyl manganese tricarbonile) is currently not widely accepted. The only other octane enhancers currently available are MTBE and other ethers such as ethyl tertiary butyl ether (ETBE) and tertiary amyl methyl ether (TAME), or alcohols such as ethanol. The ethers all tend to have similar properties and drawbacks. Ethanol is already used as a gasoline-blending component in parts of the United States where it is readily available, and in Brazil. It is an effective octane booster but has a number of drawbacks: it needs a "water-free" distribution system and is not without ground water issues. It is not recommended by the motor industry and is not cost-competitive.

To further complicate matters, the State of California has recently taken a decision to phase out MTBE. This decision was made not on health grounds but because of the taste and odor impact it can have on ground water in the event of an accidental spill. This presents a real dilemma for the oil companies because no short-term alternative appears to be acceptable to all parties.

The principal public concern is the contamination of ground water, particularly where it is used for drinking water supplies. Small amounts of MTBE are able to taint large volumes of water. A single spirit measure (30 ml) in a large swimming pool (500 $m^3$) is around the taste and odor threshold.

MTBE is used throughout Europe to boost octane rating in fuels, especially in super unleaded and lead-replacement grades. It will be used in increased amounts because the new EU fuels legislation which came into effect on 1 Jan. 2000 requires that benzene, aromatics and olefins contents of gasoline fall to lower levels and that leaded gasoline is phased out.

MTBE is a volatile, water-soluble, oxygen-containing, colorless liquid with an ethereal odor. Although is has been added to gasoline for some years, public awareness over its use emerged when reformulated gasoline became mandatory over large areas of the US in a bid to reduce vehicle exhaust emissions of carbon monoxide. MTBE has since been found in drinking water supplies and in ground water wells. This, together with the contamination of Lake Tahoe (a drinking water resource) by unburned 2-stroke fuel from boats and jet-ski exhausts, led the governor of California to call for the phasing out of MTBE use. These concerns have been largely supported by a Blue Ribbon Panel set up by the US Environmental Protection Agency (EPA).

The introduction of new fuel mixtures and esoteric additives has led oil companies to question whether existing pipeline systems can cope with the new fuels with regards to mechanical performance and permeability resistance. If either of these issues were found to be a problem at some time in the future then the oil companies would like the option to remove and replace existing pipework systems with the minimum of cost and effort. The current methods of removing such pipework are costly and disruptive and generally would involve major excavations and thus disruption to forecourt trading operations.

At the same time there is the ongoing issue of monitoring and collecting any gaseous fractions that may be emitted from such pipeline systems, particularly if new fuel mixtures are found to effect pipeline materials. This monitoring is particularly important where the additives used are water-soluble. In the event of a major spill these additives would almost inevitably enter the petrol interceptor system which is mandatory on forecourt installations. However, because the MTBE class of additives are water-soluble they will simply pass through the interceptor and enter the local drainage system.

It is an object of the present invention to provide a containment, vapor extraction and leak detection systems which overcome or at least mitigate some or all of the problems outlined above.

SUMMARY OF THE INVENTION

According to a first aspect of the present invention there is provided a pipework containment system comprising:
(i) an outer containment pipe extending between a chamber and a sump;
(ii) a fluid-tight seal between the outer containment pipe and the chamber,
(iii) a fluid-tight seal between the outer containment pipe and the sump;
(iv) a plurality of flexible supply pipes extending between said chamber and said sump;
characterized in that the plurality of supply pipes are contained within one and the same outer containment pipe and are not tightly packed together, the arrangement of supply pipes within the outer pipe and the flexibility of the supply pipes being such that each individual supply pipe may be withdrawn from the system and/or replaced after construction of the pipework containment system is complete.

This new system allows, for the first time, a series of supply pipes ito be housed within a single outer containment system and for any one supply pipe to be removed then replaced in the event of a defect being identified or in the event that a different specification of supply pipe is required.

Preferably the system further comprises a removable top section to the sump, adapted to allow access to substantially the whole of the sump opening in order to facilitate removal of one or more of the supply pipes should the need arise.

Preferably the top section of the sump is pivotally mounted. Pivotally mounted has a broad meaning in this context and includes any arrangement which allows rotational movement of the top section. In this way the top section can be rotated away from the sump opening to provide unhindered access.

In a particularly preferred embodiment the system further comprises a fluid-tight seal between the sump and atmosphere such that any spillage is contained within the sump. By providing a fluid-tight seal around the sump opening a fully sealed system from chamber to sump is provided.

Preferably the system further comprises a vapor detection system for detecting vapors in the interstitial space formed between the supply pipes and the outer containment pipe. Detection of vapor in this space provides early warning of a leak so that the system can be shut down.

Advantageously, any vapors detected are disposed of by one or more of the methods selected from the group of methods comprising:
(i) sending the vapors back to a fuel tank;
(ii) sending the vapors to a vent stack;
(iii) sending the vapor to a gas scrubber for either extraction of unwanted gases and the venting of other gases, or the collection of all gases;
(iv) sending the vapors into a catalytic converter or into some form of bacteria-containing vessel or "biotreater" for breakdown into non-hazardous chemicals;
(v) other suitable means.

The preferred method will depend on the site, its location, and what equipment is available. The choice of method will be determined by the design engineer in consultation with the owner/client.

Preferably one or more of the flexible supply pipes are secondarily contained pipes comprising primary and secondary pipes.

Preferably both primary and secondary pipes may be withdrawn from the outer containment pipe.

Preferably the containment system further comprises a storage tank.

In a preferred embodiment the chamber is an underground chamber associated with a fuel storage tank.

It is possible that the containment system further comprises a plurality of chambers and/or a plurality of sumps.

In a particularly preferred embodiment the or each sump incorporates a cover which acts to seal the sump in a fluid-tight manner.

Preferably the sump cover also acts as a drip tray to collect any small spillage or leak from a dispensing pump located above the sump.

According to a second aspect of the present invention there is provided a sump assembly comprising:
(i) a sump chamber;
(ii) a sump support framework comprising a base frame section adapted to fit over and around the sump chamber and a top frame section adapted to fit over a sump chamber opening;
wherein the top frame section is detachably mounted to the base frame section. This arrangement provides the usual support for the outside of the sump chamber whilst allowing unhindered access to the opening in the top of the sump chamber when a pipe has to be replaced.

Preferably the top frame section is pivotally mounted to the base frame section.

In an alternative arrangement the top frame section comprises a series of detachable struts which span the top of the base frame section, such that, when the struts are removed substantially unrestricted access is provided to the body of the sump chamber.

Preferably the sump assembly further comprises a drip tray.

In a particularly preferred embodiment the assembly further comprises fluid-tight seal or seals between the sump and the drip try such that the sump chamber is rendered fluid-tight.

The present invention also encompasses the pipework containment system which further comprises a sump assembly.

BRIEF DESCRIPTION OF THE DRAWINGS

The present invention will now be described by way of examples only with reference to the accompany drawings wherein:

FIGS. 1A and 1B illustrate plan and elevational views respectively of an underground chamber and sumps associated with three dispensing pump islands;

DESCRIPTION OF THE PREFERRED EMBODIMENTS

Figure 2:
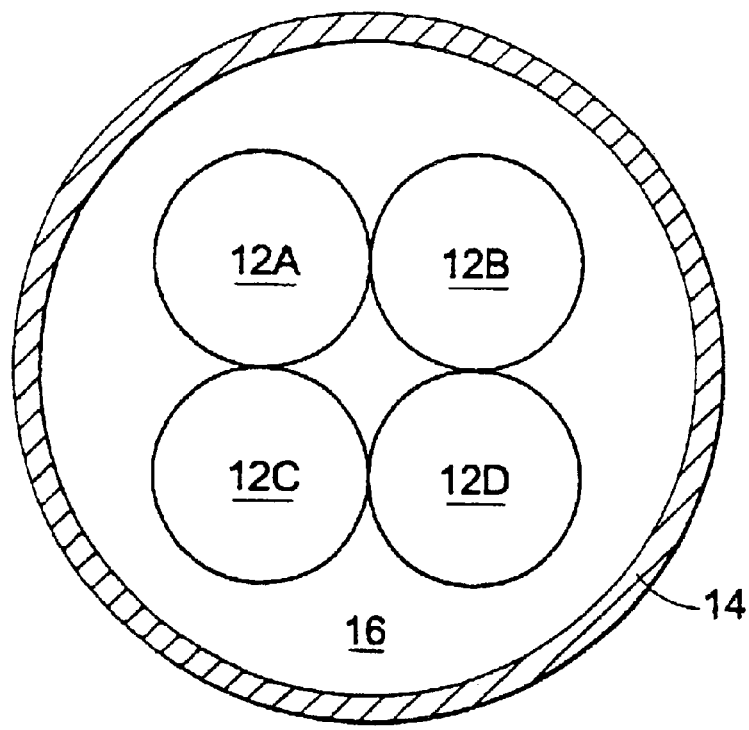
FIG. 2 shows a cross section through an outer containment pipe housing four supply pipes.
Figure 3:
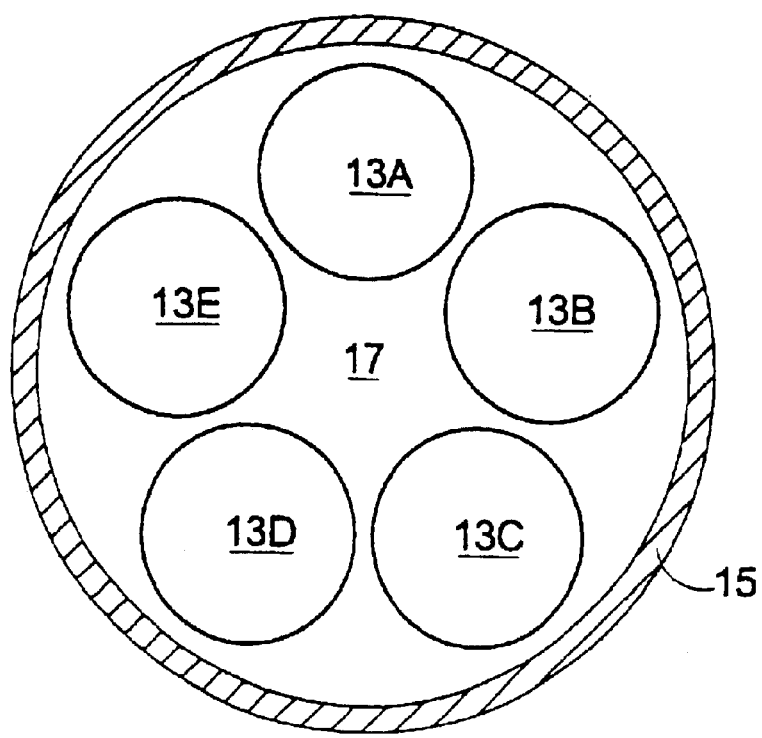
FIG. 3 shows a cross sectional view through an outer containment pipe housing five supply pipes.

The present embodiments represent the best ways known to the applicant of putting the invention into practice. However they are not the only ways in which this can be achieved. FIGS. 1A and 1B illustrate an underground chamber 10 associated with an underground fuel storage tank (not shown). The tank typically contains a plurality of compartments containing different fuels to be supplied to dispensing pumps (again not shown). The chamber is of a conventional construction and such chambers are known per se. Fuel from the fuel tanks is contained and distributed in fuel supply pipes 12 A–D. 13 A–E shown in FIGS. 2 and 3, and these pipes enter the chamber, typically through the chamber floor and exit the chamber typically through a region of the side wall 11. In this embodiment the supply pipes 12, 13 are of flexible construction, being made of plastics material and exit the chamber housed within a single outer containment pipe 14, 15. The primary pipes are not tightly packed together within the secondary pipe and, because of their flexible construction, can be disconnected at each end and withdrawn through the chamber opening.

The arrangement whereby a plurality of supply pipes are housed within the same outer containment pipe brings with it other advantages. Any fuel or vapor entering interstitial spaces 16, 17 from an of the supply pipes can be detected with a single detection system. In this context the vapor extraction and/or leak detection system can be defined as any means of collecting vapors or detecting fuel which enter the interstitial space between primary or supply pipes and the outer containment pipe in the pipework system. The vapor may be collected at one end of, or at any point along, the pipework run and may be disposed of using a number of options. For example;

(a) The vapors may be sent back to the fuel tank.
(b) The vapors may be sent to a vent stack, which is used, in the normal course of events for the venting of fuel from the fuel tank.
(c) The vapors may be directed to a gas scrubber for either extraction of unwanted gases and the subsequent venting of other gases, or for the collection of all gases.
(d) Alternatively the vapors may be directed to a catalytic converter or into some form of bacterial-containing vessel or "biotreater" for breakdown into non-hazardous chemicals.

In order that these methods may be achieved the appropriate apparatus is included within the system. Such apparatus is known per se.

Such vapor extraction and leak detection systems are known per se and the preferred type will be selected by the construction and designs specialist based on the factors known about a particular installation. Such detection systems can operate by extracting vapors by applying a vacuum to the interstitial space or by applying a positive gas pressure to the interstitial space and effectively blowing or purging the vapors into a collection system.

If a fuel leak develops in any of the supply pipes then this collection and detection system can be used to analyze the vapors released and such a chemical fuel sensor will be able to identify which particular fuel is escaping and therefore which particular supply pipe is likely to have suffered a leak. The operator will therefore be able to close down the appropriate system very quickly and before any environmental damage can be done. This obviates the need to close down all systems although this might be done for safety reasons.

The attraction of the present system is that, having detected such a leak, the faulty pipe or pipes can be withdrawn through the outer containment pipe and replaced without having to excavate the forecourt and with little or no disruption to the forecourt trading operations.

It will be appreciated that, depending on the arrangement of pump islands on a particular forecourt, it may be necessary to incorporate an array of these distribution systems. Thus one or more outer containment pipes, each containing a plurality of supply or primary pipes, may exit from one chamber. Alternatively a plurality of chambers can be provided.

It will therefore be appreciated that, in the examples illustrated, there are the following features:

The pipes for each pump island are contained within a larger pipe diameter.

Typically one or more pipes could fit into such a pipe.

A typical size pipe would be 160 mm O.D. size pipes containing 4×50 mm pipes. Of course other sizes and permutations would be possible.

The pipes would be connected to each dispenser pump island using sumps, which are positioned directly under the petrol pump dispenser. As one can see from the FIGS. 4, 5 and 6 the larger outer secondary pipe is terminated at the sump (using, for example, an electrofusion seal system as supplied by PetroTechnik Ltd) and the interstitial space internally sealed around the exposed pipes with the sumps.

Continuation of the interstitial space is maintained by the normal valve and pipe configuration that is currently used in a traditional secondary containment system.

Another variant of this design is to not seal the interstitial space within the sump but use the sealing of the sump (and or chamber) as a means of continuing the interstitial space. This allows the detection unit to detect and extract any losses within the sump or chamber region as well and is described in more detail below.

A vacuum or fan unit can be positioned remotely, connected to each chamber/sump within the system or located in a chamber or a sump which again is connected to all the other sumps and chambers.

Figure 4:
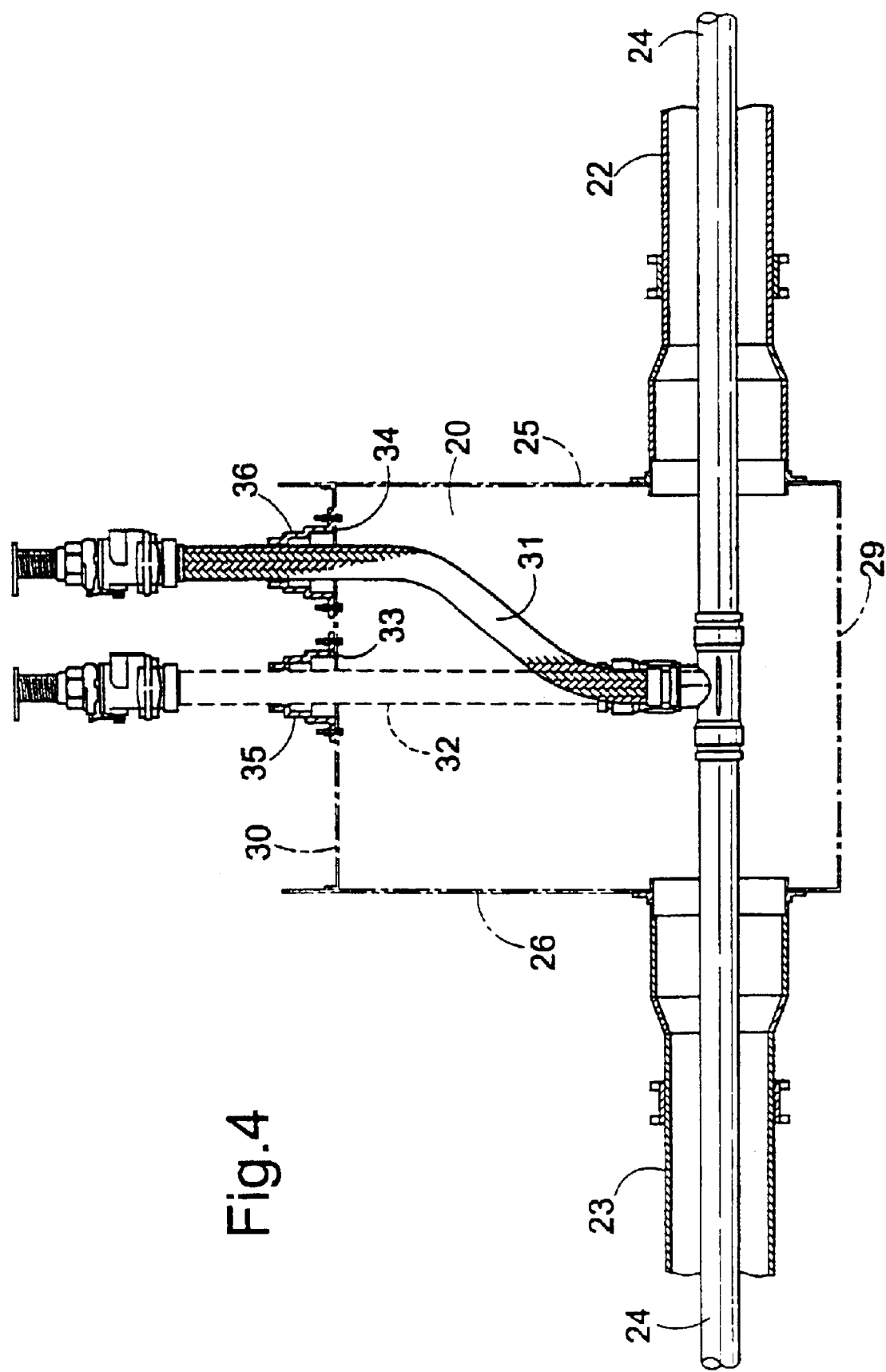
FIG. 4 illustrates a diagrammatic cross-sectional view through a sump beneath a fuel dispenser.

FIGS. 4 to 7 illustrate further aspects of the present invention. Referring to FIG. 4, this illustrates a sump 20.

The sump in this example comprises a substantially rectangular-shaped tank with four side walls 25, 26, 27 and 28 and a base 29. The top of the sump is open. The sump is, in effect, an open-topped rectangular tank and is generally made of plastics material. The sump also incorporates a cover 30 which acts to seal the sump and also provides a drip tray to collect any small spillages or leaks from the dispensing pump located above the sump.

Outer containment pipes 22, 23 enter the sump from opposing sides and a supply pipe 24 enters the sump from one side and exits through the other. The outer containment pipes 22, 23 are large enough to accommodate several more fuel supply pipes if required.

In systems known in the art, the outer containment system terminates at the sump wall and the sump is effectively open to atmosphere through the top. However, in the case of a preferred embodiment of the present invention, the sump is provided with a fluid tight cover 30. This provides, for the first time, an arrangement whereby the sump(s) form an integral part of the containment system. This is a vitally important safety feature because, in the event of a major leak from one of the primary supply pipes, the sump could quickly fill with fuel before any safety cut-off system can come into operation. If the fuel contains a water-soluble additive such as MBTE then this could escape into the environment by evaporation or through any petrol interceptor and thus into the ground water. By making the sump cover fluid tight this possibility is significantly reduced.

The fluid tight seal between the sump chamber and the cover can be achieved in a variety of ways. For example, a neoprene rubber gasket or the like can be fitted around the perimeter of the sump or the cover or both. Alternatively, an O-ring seal can be provided around either the sump or the cover.

Figure 6:
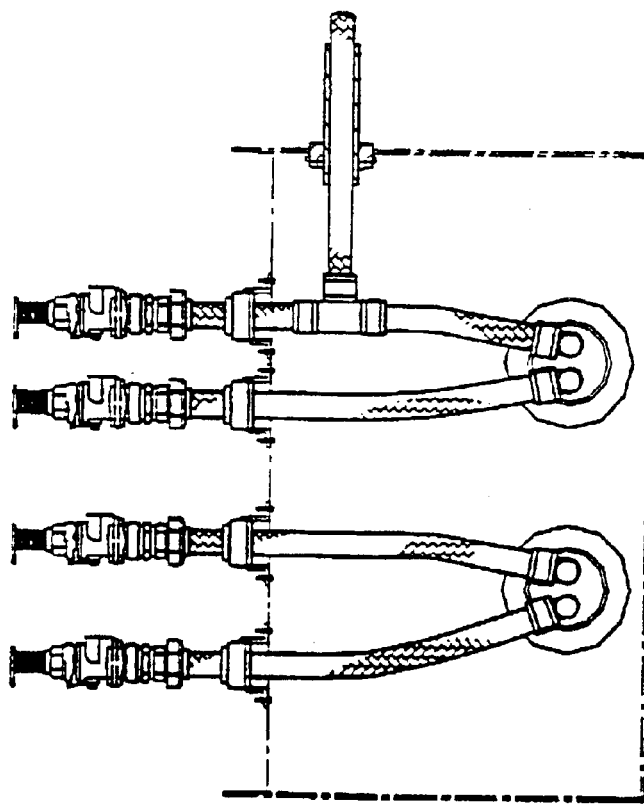
FIGS. 5 and 6 illustrate typical coupling arrangements within a sump using compression fittings and electrofusion fittings respectively.
Figure 5:
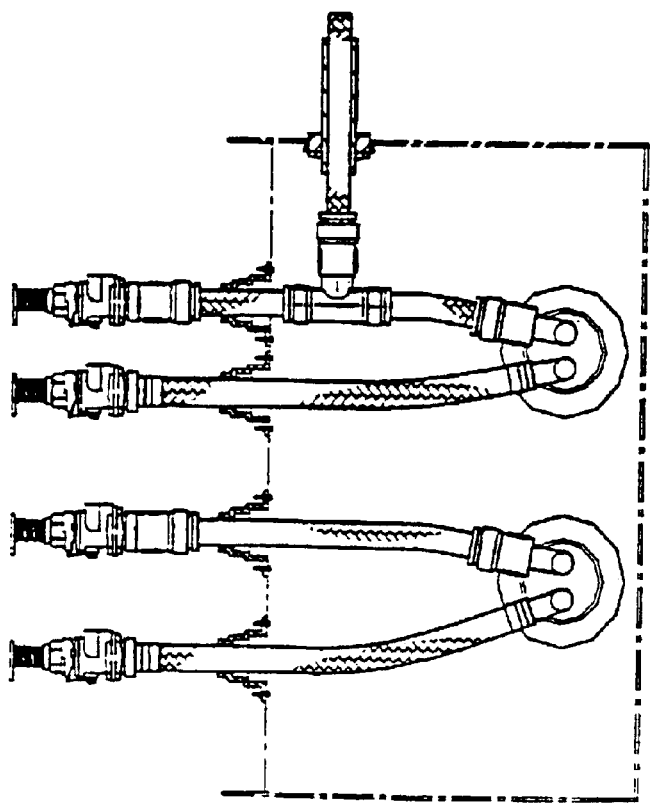

It will be appreciated from FIGS. 4, 5 and 6 that a portion of the supply pipe 31, 32 extends through the sump cover en route to the dispensing pump. The location of such pipe runs will vary from installation to installation. It is therefore envisaged that the cover will be supplied to site as an intact unit with no penetrations. Holes of the necessary size will be cut on site to suit each particular sump/pipework configuration arrangement. Flange fittings including upstands can be fitted by bolting these to the cover, by electrofusion welding, by chemical welding or by other suitable means. A rubber boot 35, 36 is then fitted over the primary pipe and attached to the flange fitting and the primary pipe to complete a fluid tight seal.

In a further aspect of the present invention the fluid tight sump arrangement described above can be used in place of existing sumps. That is to say, it can be used in pipework systems which do not include multiple primary pipes contained within the same secondary containment pipe system.

FIGS. 5 and 6 illustrate alternative arrangements of sumps according to this aspect of the present invention with multiple primary pipes housed within one outer containment pipe.

The outer containment pipe may be considered as a secondary containment system. However, it is desirable that the supply pipes 24 are themselves secondarily contained. Such secondarily contained pipes for transporting gasoline are known. One example is the UPP Petro pipe range supplied by PetroTechnik Limited. However, an attraction of the system is that any flexible piping system can be used, and the pipes may be made from any suitable plastics material. When secondarily contained pipe are used then this can be considered a tertiary containment system.

Figure 7:
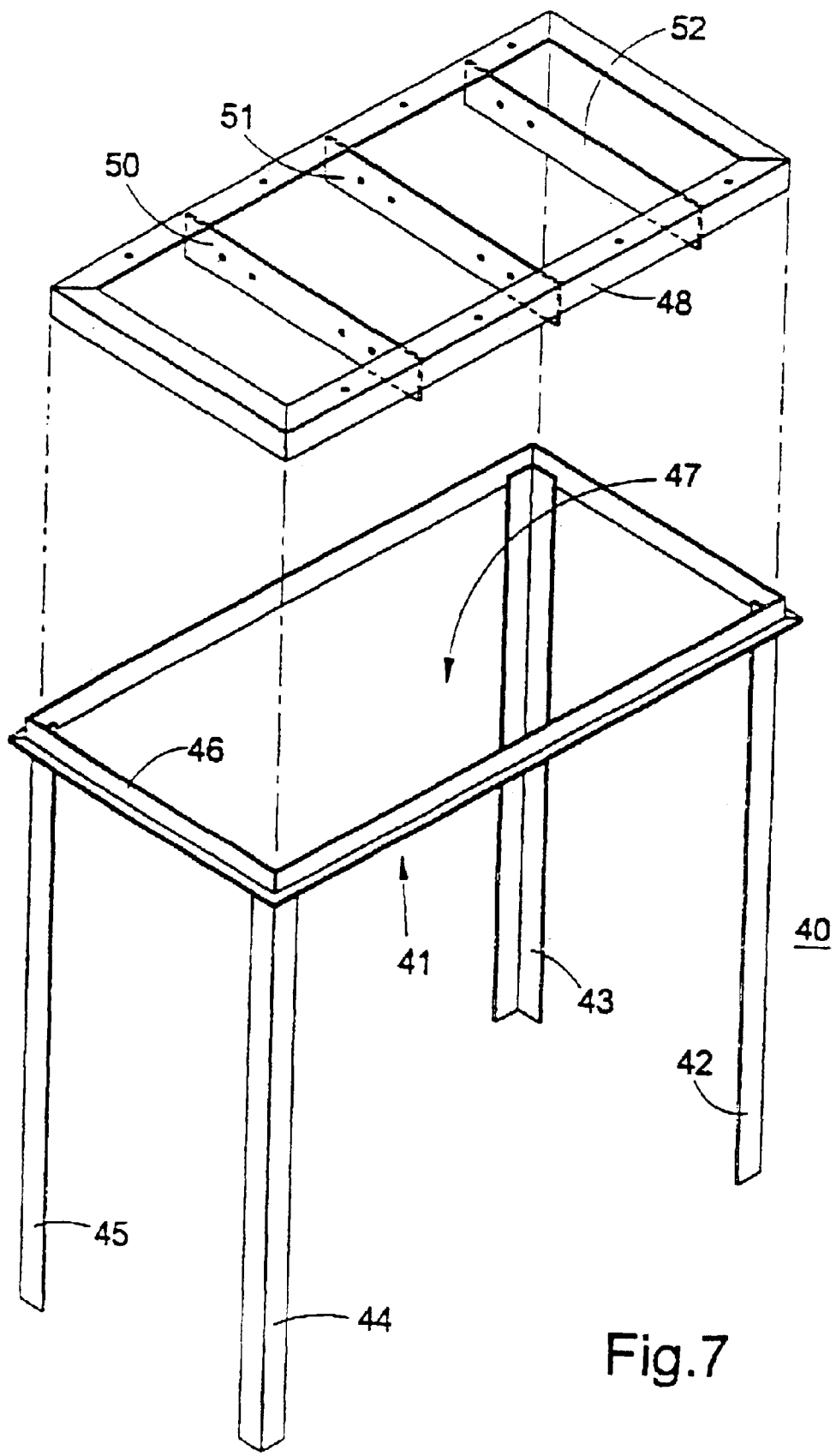
FIG. 7 illustrates a framework with a removable frame top section for incorporation within a sump.

A further aspect of the present invention is illustrated in FIG. 7. In prior art arrangements the sump in petroleum forecourt installations is generally placed within a metal framework support. This framework has an integral frame top section designed to support the pipework connections underneath the dispensing pump. These framework supports are typically of one-piece construction and, once concreted in place, prevent subsequent movement or removal of the sump without major works. However, by the very nature of their construction they also restrict access to the top of the sump chamber. In the event that primary pipes have to be withdrawn through the sump, they represent a real obstacle and hindrance to this operation.

In this latest aspect of the present invention the frame top section and the base section of the sump support are separate items and the frame top section is easily removable. This arrangement is shown more clearly in FIG. 7. This illustrates a framework support 40 which consists of a base section 41 having downwardly depending legs 42, 43, 44, 45 joined to a perimeter frame 46 and a detachable frame top section 48. The frame top section 48 is detachably mounted onto the base 41.

In one embodiment the frame top section is pivotally mounted onto the base 41. In the present invention the terms "detachably mounted" and "pivotally mounted" both have broad meanings. Detachably mounted means that the frame top section can be moved away from the opening 47 in the base section 41. This could include the frame top section being hinged onto the base 41 along one side or one end. Pivotally mounted is intended to have a broader meaning than simply hinged. It is intended to encompass any mounting arrangement which allows rotational motion of the frame top section with respect to the base 41. It encompasses complex mounting arrangements which allow both lateral and rotational movement of the frame top section.

As an alternative to the above, the pipe supports 50, 51 and 52 can be detachably mounted to the perimeter frame or to the frame top section. In either case, removing the pipe supports 50, 51 and 52 gives clear unhindered access into the sump once the drip tray 30 has been removed.

A key feature of all these arrangements is that the pipe supports 50, 51 and 52, either alone or in combination with the frame top section, are removable such that unrestricted access is provided to the body of the sump chamber in the event that one or more of the flexible primary pipes needs to be withdrawn and subsequently replaced.

The basis and object of this concept is to gain access to underground pipework, for maintenance, retraction and insertion of primary pipework. Multiple primary pipes are contained in an outer containment pipe which terminates on the under pump sump as described above. These sumps are generally constructed of a steel frame consisting of welded angle to suit the dispenser which will be above it. Inside this frame is a simple container made of polyethylene, glass reinforced plastic or other suitable material to contain leaks, to terminate pipework and to offer a maintenance area if required for the pipework and fittings.

Once this frame and container are buried, they are fixed with concrete and eventually become part of the garage forecourt. The dispenser may be removed but the support bars for the pipes remain, which hinders any maintenance or reinstallation if required due to the obstructions. The concrete which surrounds the frame and sump prevents them being moved or removed without major disruption.

The concept of the present invention provides, for the first time, sump assembly comprising a sump pump support framework with a removable top section, either fully removable or hinged, to gain free access to the pipes contained within. The outer containment pipework is fixed in the ground, allowing the primary pipework to move within it. If the primary or supply pipework needs to be removed, the pump frame top may be removed allowing access for disassembly and withdrawing/reinserting pipes.

Associated with this removable frame is a drip tray, to which one can attach seals to the protruding pipework supplying the fuel dispenser giving a complete airtight and liquid tight sump. This will allow airflow through the pipework, and sump, to enable any escaping vapors to be captured and dealt with as described above. In addition, this arrangement will trap drips from the dispenser if they occur and prevent them from entering the main sump chamber.

With regards to the materials of construction these will be selected by the materials specialist as appropriate for each installation. Typically the framework support is constructed from steel and the primary, secondary and outer containment pipes are constructed from suitable plastics materials. For example, the outer containment pipe may comprise a plastics material selected from the group:

polyethylene;
polypropylene;
polyvinylchloride.

The primary pipe typically incorporates an inner barrier layer and the preferred inner barrier material must have very low permeability to petroleum spirit and the various chemicals found in petrol and diesel fuels. Nylon 612 is one of the preferred materials. However, other materials can be used and these include polyamides, polyamides 6, 11 or 12, polyethylene terephthalate, polyvinylchloride, polyvinylidenechloride or fluoride, polypropylene, ethylene/vinyl alcohol copolymers, or mixtures thereof, the selection being based on the nature of the fluid being conveyed.

This selection is not intended to be limiting but rather demonstrates the flexibility and breadth of materials which can be used in this type of pipework. The plastics material with the lowest permeability to the fluid in question will usually be chosen. Furthermore, it is known to use blends of two or more polymers and this invention extends to cover pipes constructed from known and yet to be developed polymers and blends of plastics material. The main body of the primary pipe can be constructed from polyethylene, polypropylene, polyvinylchloride or variations and combinations of the plastics materials specified for the inner barrier layer. In this context the term 'fluid' has a broad meaning to encompass liquids, gases and vapors.

What is claimed is:

1. A pipework containment system comprising:
   (i) a chamber, a sump and an outer containment pipe extending between said chamber and said sump;
   (ii) a fluid-tight seal between said outer containment pipe and said chamber;
   (iii) a fluid-tight seal between said outer containment pipe and said sump;
   (iv) a plurality of flexible supply pipes contained within said outer containment pipe and extending between said chamber and said sump;

wherein said plurality of supply pipes are not tightly packed together, and wherein the arrangement of supply pipes within said outer pipe and the flexibility of said supply pipes being such that each of said supply pipes may be withdrawn from said system.

2. A pipework containment system as claimed in claim 1, wherein said containment system further comprises a storage tank.

3. A pipework containment system as claimed in claim 1, wherein interstitial spaces are formed between said supply pipes and said outer containment pipe and wherein said system further comprises a vapor detection system for detecting vapors in said interstitial spaces.

4. A pipework containment system as claimed in claim 3, wherein the said system further comprises means for disposing vapors detected in said interstitial spaces.

5. A pipework containment system as claimed in claim 1, wherein said sump has an opening and wherein said system further comprises a removable top section coupled to said sump adapted to allow access to substantially the whole of said sump opening in order to facilitate removal of said supply pipes should the need arise.

6. A pipework containment system as claimed in claim 5, wherein said top section of said sump is pivotally mounted.

7. A pipework containment system as claimed in claim 1, wherein said system further comprises a fluid-tight seal between said sump and atmosphere such that any spillage is contained within said sump.

8. A pipework containment system as claimed in claim 1, wherein said chamber is an underground chamber associated with a fuel storage tank.

9. A pipework containment system as claimed in claim 1, wherein said containment system further comprises a plurality of chambers.

10. A pipework containment system as claimed in claim 1, wherein said containment system further comprises a plurality of sumps.

11. A pipework containment system as claimed in claim 1, wherein said sump has a cover which acts to seal the sump in a fluid-tight manner.

12. A pipework containment system as claimed in claim 11, wherein said sump cover also acts as a drip tray to collect any small spillage from above the sump.

13. A pipework containment system as claimed in claim 1, wherein said sump is part of a sump assembly, said sump assembly comprising:

(i) a sump chamber having a body with an opening;

(ii) a sump support framework comprising a base frame section adapted to fit over said sump chamber and a top frame section adapted to fit over said sump chamber opening;

wherein said top frame section is detachably mounted to said base frame section.

14. A pipework containment system as claimed in claim 13, wherein said top frame section of said sump assembly is pivotally mounted to said base frame section.

15. A pipework containment system as claimed in claim 13, wherein said top frame section of said sump assembly comprises a series of detachable struts which span the top of said base frame section, such that, when said struts are removed substantially unrestricted access is provided to the body of the sump chamber via said opening thereof.

16. A pipework containment system as claimed in claim 13, wherein said sump assembly further comprises a drip tray.

17. A pipework containment system as claimed in claim 16, wherein said sump assembly further comprises a fluid-tight seal between said sump and said drip tray such that said sump chamber is rendered fluid-tight.

18. A pipework containment system as claimed in claim 1, wherein the arrangement of supply pipes within said outer pipe and the flexibility of said supply pipes being such that each of said supply pipes may be withdrawn from said system and replaced after construction of the pipework containment system is complete.

* * * * *